US012735253B2

(12) United States Patent
Fjeldheim et al.

(10) Patent No.: US 12,735,253 B2
(45) Date of Patent: Sep. 15, 2026

(54) CONTAINER HANDLING VEHICLE FOR HANDLING A DELIVERY CONTAINER STORED WITHIN A STORAGE CONTAINER AND A METHOD THEREOF

(71) Applicant: Autostore Technology AS, Nedre Vats (NO)

(72) Inventors: Ivar Fjeldheim, Haugesund (NO); Ingvar Fagerland, Kolnes (NO); Trond Austrheim, Etne (NO); Jørgen Djuve Heggebø, Langhus (NO)

(73) Assignee: AutoStore Technology AS, Nedre Vats (NO)

( * ) Notice: Subject to any disclaimer, the term of this patent is extended or adjusted under 35 U.S.C. 154(b) by 357 days.

(21) Appl. No.: 18/554,593

(22) PCT Filed: Apr. 7, 2022

(86) PCT No.: PCT/EP2022/059208
§ 371 (c)(1),
(2) Date: Oct. 9, 2023

(87) PCT Pub. No.: WO2022/214580
PCT Pub. Date: Oct. 13, 2022

(65) Prior Publication Data

US 2024/0190652 A1 Jun. 13, 2024

(30) Foreign Application Priority Data

Apr. 9, 2021 (NO) .................................... 20210436
Apr. 30, 2021 (NO) .................................... 20210523
Aug. 30, 2021 (NO) .................................... 20211040

(51) Int. Cl.
*B65G 1/04* (2006.01)

(52) U.S. Cl.
CPC ......... *B65G 1/0464* (2013.01); *B65G 1/0478* (2013.01); *B65G 2201/0235* (2013.01)

(58) Field of Classification Search
CPC ................ B65G 1/0464; B65G 1/0478; B65G 2201/0235
See application file for complete search history.

(56) References Cited

U.S. PATENT DOCUMENTS 10,815,057 B2 10/2020 Fosnight et al.
2008/0193270 A1 8/2008 Yoshida et al.
(Continued)

FOREIGN PATENT DOCUMENTS

CN 106272497 B 11/2018
CN 110606365 A 12/2019
(Continued)

OTHER PUBLICATIONS

International Search Report issued in International Application No. PCT/EP2022/059208, mailed Jul. 20, 2022 (4 pages).
(Continued)

*Primary Examiner* — Kyle O Logan
(74) *Attorney, Agent, or Firm* — Baker Botts L.L.P.

(57) ABSTRACT

A container handling vehicle is fitted with a coupler for coupling to a delivery container and/or to a storage container. The coupler includes a coupler frame, a delivery container gripper, and a storage container gripper. The delivery container gripper is provided on the coupler frame and protrudes from a lower face of the coupler frame. The delivery container gripper is configured to enable releasable coupling to corresponding coupling structure of a delivery container. The storage container gripper is provided on the coupler frame and protrudes from the lower face of the coupler frame. The storage container gripper is configured to enable releasable coupling to corresponding coupling struc-
(Continued)

tures of a storage container having a size allowing the delivery container to be held therein. The delivery container gripper includes two gripper paddles for gripping the delivery container. Each gripper paddle is pivoted from a pivot axis spaced equally and oppositely from a vertical centre plane oriented perpendicular to the lower face of the coupler frame. Each of the gripper paddles includes a protrusion located below the lower face of the coupler frame for insertion into a corresponding coupling structure of the delivery container.

15 Claims, 12 Drawing Sheets

(56) References Cited

U.S. PATENT DOCUMENTS

| | | | | |
|---|---|---|---|---|
| 2016/0129587 | A1* | 5/2016 | Lindbo | B25J 9/0093 700/218 |
| 2018/0244468 | A1* | 8/2018 | Hognaland | B65G 1/0478 |
| 2019/0047787 | A1* | 2/2019 | Fosnight | B66C 1/445 |
| 2020/0216263 | A1* | 7/2020 | Fjeldheim | B65G 1/0464 |
| 2020/0223629 | A1 | 7/2020 | Lindbo et al. | |
| 2020/0290804 | A1* | 9/2020 | Fjeldheim | B65G 1/0464 |
| 2021/0016966 | A1 | 1/2021 | Heggebøet al. | |
| 2021/0221618 | A1 | 7/2021 | Austrheim | |

FOREIGN PATENT DOCUMENTS

| | | | |
|---|---|---|---|
| CN | 112262089 | A | 1/2021 |
| DE | 4229215 | A1 | 3/1993 |
| DE | 4203823 | A1 | 8/1993 |
| DE | 4311146 | A1 | 10/1994 |
| EP | 0509499 | A1 | 10/1992 |
| EP | 2953135 | A2 | 12/2015 |
| EP | 2962962 | A1 | 1/2016 |
| JP | 2002087516 | A | 3/2002 |
| JP | 2013045964 | A | 3/2013 |
| NO | 317366 | B1 | 10/2004 |
| NO | 342459 | B1 | 5/2018 |
| WO | 9902436 | A1 | 1/1999 |
| WO | 2014090684 | A1 | 6/2014 |
| WO | 2015193278 | A1 | 12/2015 |
| WO | 2017211634 | A1 | 12/2017 |
| WO | 2018146304 | A1 | 8/2018 |
| WO | 2019032651 | A1 | 2/2019 |
| WO | 2019101366 | A1 | 5/2019 |
| WO | 2019206482 | A1 | 10/2019 |
| WO | 2019206487 | A1 | 10/2019 |
| WO | 2019229170 | A2 | 12/2019 |
| WO | 2021018649 | A1 | 2/2021 |
| WO | 2021032888 | A1 | 2/2021 |

OTHER PUBLICATIONS

Written Opinion issued in International Application No. PCT/EP2022/059208; Dated Jul. 20, 2022 (9 pages).

Search Report issued in Norwegian Application No. 20210436; Dated Nov. 9, 2021 (2 pages).

Search Report issued in Norwegian Application No. 20210523; Dated Jan. 7, 2022 (2 pages).

Search Report issued in Norwegian Application No. 20211040; Dated Mar. 31, 2022 (2 pages).

Coquau, Stephane, Communication in EPO application 22721070.5, mailed Nov. 13, 2025, 5 pages, pub. by European Patent Office, Munich, Germany.

Gao, Yufei, examining action in Chinese patent application CN202280026573.4, mailed Jun. 17, 2025, 11 pages, published by State Intellectual Property Office of the People's Republic of China, Beijing, China.

* cited by examiner 19
3"
7
1
2
3
4
4
3
4
4
21
21
6
106
9a
8
9b
22
3'
20

CONTAINER HANDLING VEHICLE FOR HANDLING A DELIVERY CONTAINER STORED WITHIN A STORAGE CONTAINER AND A METHOD THEREOF

FIELD OF THE INVENTION

The present invention relates a coupler for releasable coupling to a delivery container, a container handling vehicle using such a coupler and a method thereof.

BACKGROUND AND PRIOR ART

FIG. 1 discloses an automated storage and retrieval system 100 with a framework/storage grid 101 supported on a floor/platform 700 and FIGS. 2, 3 and 4 disclose three different prior art container handling vehicles 200,300,350 suitable for operating on such a storage grid 101.

The framework 101 comprises upright members 102 and a storage volume comprising storage columns 105 arranged in rows between the upright members 102. In these storage columns 105 storage containers 106, also known as bins, are stacked one on top of one another to form stacks 107. The members 102 may typically be made of metal, e.g. extruded aluminum profiles.

The framework 101 of the automated storage and retrieval system 100 comprises a rail system 108 arranged across the top of the framework 101, on which rail system 108 a plurality of container handling vehicles 200,300,350 may be operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 200,300,350 in a first direction X across the top of the framework 101, and a second set of parallel rails 111 arranged perpendicular to the first set of rails 110 to guide movement of the container handling vehicles 200,300,350 in a second direction Y which is perpendicular to the first direction X. Containers 106 stored in the storage columns 105 are accessed by the container handling vehicles 200,300,350 through access openings 112 in the rail system 108. The container handling vehicles 200,300,350 can move laterally above the storage columns 105, i.e. in a plane which is parallel to the horizontal X-Y plane.

The upright members 102 of the framework 101 may be used to guide the storage containers 106 during raising of the containers out from, and lowering of the containers into, the columns 105. The stacks 107 of containers 106 are typically self-supportive.

Referring to FIGS. 2-4, each prior art container handling vehicle 200,300,350 comprises a vehicle body 201,301,351 and first and second sets of wheels 202*a*,202*b*,302*a*,302*b*, 352*a*,352*b* which enable the lateral movement of the container handling vehicles 200,300,350 in the X direction and in the Y direction, respectively. In FIGS. 2 and 3 two wheels in each set of four wheels are visible, while in FIG. 4, three wheels in each set of four wheels are visible. The first set of wheels 202*a*,302*a*,352*a* is arranged to engage with two adjacent rails of the first set 110 of rails, and the second set of wheels 202*b*,302*b*,352*b* is arranged to engage with two adjacent rails of the second set 111 of rails. At least one of the sets of wheels 202*a*,302*a*,352*a*,202*b*,302*b*,352*b* can be lifted and lowered, so that the first set of wheels 202*a*,302*a*, 352*a* and/or the second set of wheels 202*b*,302*b*,352*b* can be engaged with the respective set of rails 110, 111 at any one time.

Each prior art container handling vehicle 200,300,350 also comprises a lifting device 210,360 for vertical transportation of storage containers 106, e.g. raising a storage container 106 from, and lowering a storage container 106 into, a storage column 105. The lifting device 210,360 comprises one or more gripper elements 362 which are adapted to engage a storage container 106, and which gripping elements 362 can be lowered from the vehicle 200,300,350 so that the position of the gripping elements 362 with respect to the vehicle body 201,301,351 can be adjusted in a third direction Z orthogonal to the first direction X and the second direction Y. The lifting device 210,360 may also comprise lifting bands (not shown) connected at one end to a frame of the lifting device 210,360 and the other end to a winch mechanism (not shown). A part of the lifting device 210,360 of the container handling vehicles 200,350 are shown in FIG. 2 and FIG. 4. The lifting device of the container handling vehicle 300 shown in FIG. 3 is located within the vehicle body 301.

Conventionally, and also for the purpose of this application, Z=1 identifies the uppermost layer of storage containers, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, 7 indicated in FIG. 1, the storage container identified as 106' in FIG. 1 can be said to occupy storage position X=19, Y=1 and Z=3. The container handling vehicles 200,300 can be said to travel in layer Z=0, and each storage column 105 can be identified by its X and Y coordinates.

The possible storage positions within the framework/storage grid 101 are referred to as storage cells. Each storage column 105 may be identified by a position in an X- and Y-direction, while each storage cell may be identified by a container number in the X-, Y and Z-direction.

Each prior art container handling vehicle 200,300,350 comprises a storage compartment or space for receiving and stowing a storage container 106 when transporting the storage container 106 across the rail system 108.

The storage space may be below a cantilever construction of a container handling vehicle 200 as shown in FIG. 2. Such a vehicle is described in detail in e.g. NO317366, the contents of which are also incorporated herein by reference.

In another configuration, the storage space may comprise a cavity arranged internally within the vehicle body 301,351 as shown in FIGS. 3 and 4 and as described in e.g. WO2015/193278A1 and WO2019/206487A1, the contents of which are incorporated herein by reference.

The container handling vehicles 300 shown in FIG. 3 may have a centrally arranged cavity and a footprint that covers an area with dimensions in the X and Y directions which is generally equal to the lateral extent of a storage column 105, e.g. as described in WO2015/193278A1, the contents of which are incorporated herein by reference.

Alternatively, the cavity container handling vehicles 350 may have a footprint which is larger than the lateral area defined by a storage column 105 as shown in FIGS. 1 and 4, and as is disclosed in e.g. WO2014/090684A1, EP2962962 or WO2019/206487A1.

Note that the term 'lateral' used herein may mean 'horizontal'.

FIG. 1 shows container handling vehicles with a plurality of cantilever vehicles 200 (FIG. 3) and a plurality of cavity vehicles 350 (FIG. 4) which extend beyond the footprint of a single storage column 105.

The rail system 108 typically comprises rails 110,111 with grooves in which the wheels of the vehicles run. Alternatively, the rails 110,111 may comprise upwardly protruding elements, where the wheels of the vehicles comprise flanges to prevent derailing. These grooves and upwardly protruding elements are collectively known as tracks. Each rail 110,111 may comprise one track, or each rail 110,111 may comprise two parallel tracks. Each rail 110,111 may also comprise two track members that are fastened together, each track member providing one of a pair of tracks provided by each rail.

WO2018/146304, the contents of which are incorporated herein by reference, illustrates a typical configuration of rail system 108 comprising rails and parallel tracks in both X and Y directions.

In the framework 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 200,300,350 to drop off and/or pick up storage containers 106 so that they can be transported to an access station (not shown) where the storage containers 106 can be accessed from outside of the framework 100 or transferred out of or into the framework 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1, the first port column 119 may for example be a drop-off port column where the container handling vehicles 200,300,350 can drop off storage containers 106 to be transported to an access and distribution station 500, and the second port column 120 may be a dedicated pick-up port column where the container handling vehicles 200,300,350 can pick up storage containers 106 that have been transported from the access and distribution station.

The access and distribution station may typically be a picking or a stocking station where product items are removed from or positioned into the storage containers 106. In a picking or a stocking station, the storage containers 106 are normally not removed from the automated storage and retrieval system 100, but are returned into the framework 100 again once accessed. A port can also be used for transferring storage containers to another storage facility (e.g. to another framework or to another automated storage and retrieval system), to a transport vehicle (e.g. a train or a lorry), or to a production facility.

When a target storage container 106' stored in one of the columns 105 disclosed in FIG. 1 is to be accessed, one of the container handling vehicles 200,300,350 is instructed to retrieve the target storage container 106' from its position and transport it to the drop-off port column 119. This operation involves moving the container handling vehicle 200,300,350 to a location above the storage column 105 in which the target storage container 106' is positioned, retrieving the storage container 106 from the storage column 105 using the container handling vehicle's 200,300,350 lifting device 210,360, and transporting the storage container 106 to the drop-off port column 119. If the target storage container 106' is located deep within a stack 107, i.e. with one or a plurality of other storage containers 106 positioned above the target storage container 106', the operation also involves temporarily moving the above-positioned storage containers 106 prior to lifting the target storage container 106' from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 100 may have container handling vehicles specifically dedicated to the task of temporarily removing storage containers from a storage column 105. Once the target storage container 106' has been removed from the storage column 105, the temporarily removed storage containers 106 can be repositioned into the original storage column 105. However, the removed storage containers 106 may alternatively be relocated to other storage columns 105.

When a storage container 106' is to be stored in one of the columns 105, one of the container handling vehicles 200,300,350 is instructed to pick up the storage container 106' from the pick-up port column 120 and transport it to a location above the storage column 105 where it is to be stored. After any storage containers 106 positioned at or above the target position within the storage column stack 107 have been removed, the container handling vehicle 200,300,350 positions the target storage container 106' at the desired position. The removed storage containers 106 may then be lowered back into the storage column 105, or relocated to other storage columns.

For monitoring and controlling the automated storage and retrieval system 100, e.g. monitoring and controlling the location of respective storage containers 106 within the framework 101, the content of each storage container 106, and the movement of the container handling vehicles 200,300,350 so that a desired storage container 106' can be delivered to the desired location at the desired time without the container handling vehicles 200,300,350 colliding with each other, the automated storage and retrieval system 100 comprises a control system 600 which typically is computerized and which typically comprises a database for keeping track of the storage containers 106.

To facilitate the storage and retrieval of inventory and/or other items stored with the storage containers 106, the items may be picked from the storage containers and placed into delivery containers adapted for handling by systems outside the above described framework 101.

In particular for large storage systems, the number of storage container retrievals per hour may be tens of thousands, corresponding to typically hundreds or thousands of customer orders, and each of these customer orders may include several different items. In order to allow efficient handling and delivery of the different items in each customer order, while at the same time avoiding installation of an excessive number of expensive conveyor belts and automated handling systems, the items should be continuously consolidated into delivery containers and set aside until the moment of dispatchment.

One problem with current consolidation systems is the need for large external areas for storing consolidated delivery containers. The availability of such temporary storage is however often low since it is of importance for operational and economical reasonings that the space taken up by the storage system should be as large as possible.

An objective of the present invention is therefore to allow effective consolidation of items from storage containers into delivery containers with little or no need of using areas surrounding the framework/storage grid to store these consolidated delivery containers prior to shipments.

SUMMARY OF THE INVENTION

The invention is set forth in the independent claims and the dependent claims describe certain optional features of the invention.

In accordance with a first aspect, the invention concerns a container handling vehicle fitted with a coupler for coupling to a delivery container and/or to a storage container.

The coupler comprises a coupler frame, a delivery container gripper provided on the coupler frame and protruding from a lower face of the coupler frame. The delivery container gripper may be pivoted to or hinged to the coupler frame and is configured to enable releasable coupling to corresponding coupling structure(s) of a delivery container.

The vehicle further comprises a storage container gripper provided on the coupler frame and protruding from the lower face of the coupler frame. The storage container gripper is configured to enable releasable coupling to corresponding coupling structure(s) of a storage container having a size allowing the delivery container to be at least partly, preferably fully, held therein.

In an advantageous example of the first aspect of the invention, the container handling vehicle may further comprise a lifting mechanism connected to the coupler frame such that the lower face of the coupler frame is aligned with a horizontal plane along which the container handling vehicle may move. Moreover, the lifting mechanism and the coupler may be configured to allow transport of the storage container and/or the delivery container into and out of a space provided for the storage container being handled by the container handling vehicle.

The container handling vehicle may involve a suspended crane and/or wheeled or tracked vehicles moving on a base such as a floor or a rail system.

Said lifting mechanism may comprise bands connected to the coupler frame and one or more axle/shafts around which the bands may be spooled. The axle(s) may be rotated using one or more lifting motors rotationally coupled thereto. Alternatively, or in addition, the axle, or each of the axles, may be driven shaft of the lifting motor(s). The bands may be attached to mounts of the coupler frame, preferably arranged at or near the corners of the coupler frame's upper face. The mounts may be configured such that the length of each band of the lifting mechanism may be adjusted to ensure sufficient levering of the coupler frame relative to the containers to be picked. For example, one or more of the mounts may comprise a rotating axle/winch shaft around which the bands are spooled. The axle(s) may be driven by one or more motors. Moreover, one or more of the mounts may comprise means to distribute power and communication signal from cables running along the bands to one or more control systems controlling the delivery container gripper and/or the storage container gripper.

In another advantageous example of the invention, the coupler further comprises one or more storage container sensors configured to sense when the lower face of the coupler frame is in contact with, and/or in proximity to, an upper rim of the storage container. For example, the coupler may include at least four storage container sensors distributed at the corners of the coupler frame's lower face matching the positions of the corners of the storage container's rim.

In yet another advantageous example of the invention, the coupler further comprises one or more delivery container sensors configured to sense when the lower face of the coupler frame is in contact with, and/or in proximity to, an upper rim of the delivery container. For example, the coupler may include at least four delivery container sensors distributed at the corners of the coupler frame's lower face matching the positions of the corners of the delivery container's rim.

In yet another advantageous example of the invention, the coupler further comprises a vehicle sensor configured to sense when an upper portion of the coupler is in contact with, and/or in proximity to, a part of the container handling vehicle setting an upper vertical boundary the space provided for the storage container.

The storage container sensor(s) and/or vehicle sensor(s) may be in the form of spacer(s) abutting the rim of the storage container at desired vertical position.

The storage container sensor(s) and/or vehicle sensor(s) may also, or alternatively, be in form of a capacitive sensor (mutual capacitance and/or self-capacitance) for registering direct contact or proximity with the coupler frame or vehicle/crane.

In yet another advantageous example of the invention, the vehicle further comprises a mechanism allowing the storage container gripper to releasably grip the storage container. Such mechanism may be arranged at least partly, preferably fully, within the coupler frame. The mechanism may involve an axle rotationally and/or translationally coupled to a motor, where the rotation/translation of the axle operates the storage container gripper.

The storage container gripper may comprise a plurality of claws distributed at or near a periphery of the lower face of the coupler frame, wherein the spacing of the claws on the coupler correspond to the size of the rim of the storage container.

In yet another advantageous example of the invention, the coupler further comprises a plurality of guiding pins protruding from the lower face of the coupler frame for insertion into receiving recesses of the storage container. The position of each guiding pin receiving recess is such that, when the lower face of the coupler frame is arranged in a coupling position above the storage container, each guiding pin is horizontally aligned with the corresponding guiding pin receiving recess.

In yet another advantageous example of the invention, the delivery container gripper comprises at least two gripper paddles for gripping a delivery container. The gripper paddles are displaced in opposite directions from a vertical centre plane $C_{VP}$ oriented perpendicular to the lower face of the coupler frame. For example, each paddle may be pivoted from a pivot axis spaced equally and oppositely from the vertical centre plane $C_{VP}$. Alternatively, each paddle may act as a biased spring being fixed at one end to the coupler frame. Furthermore, each of the gripper paddles may comprise a protrusion located below the lower face of the coupler frame for insertion into a corresponding coupling structure of the delivery container.

The coupling structure is preferably located within the inner volume of the delivery container. For example, the coupling structure may comprise corresponding indents or recesses within the inner walls of the container, or through-going holes, at both sides of the vertical centre plane $C_{VP}$.

The delivery container gripper may further comprise a displacement system for displacing, for example pivoting, the two gripper paddles in opposite directions from the vertical centre plane $C_{VP}$ until the protrusions have engaged the respective coupling structure(s), for example respective indents or recesses.

The displacement system may comprise a gripper motor, a coupler control system configured to control operation of the gripper motor, a first link constituting part of a gripper displacement means, connected at one end at least indirectly to the gripper motor and the other end to one of the two gripper paddles and a second link constituting part of the gripper displacement means, connected at one end at least indirectly to the gripper motor and the other end to the other of the two gripper paddles. The gripper motor is preferably configured to displace the first and second links in opposite directions away from the vertical centre plane $C_{VP}$. Hence, both links are arranged to couple rotational movements from the gripper motor to the respective gripper paddles to ensure the desired displacements.

The displacement system may further comprise a rotary element such as a disc connecting the first and second links to a shaft of the gripper motor. The gripper motor, the rotary element and the links are in this particular arrangement configured such that the opposite directed displacement of the first and second links is achieved by rotating the rotary element clockwise or counterclockwise between 0 degrees and 180 degrees, preferably between 80 and 100 degrees, for example 90 degrees.

The motor constituting part of the above-mentioned mechanism for allowing the storage container gripper to releasably grip the storage container is preferably arranged at or above the gripper motor relative to the lower face of the coupler frame.

Furthermore, the control system set to control the gripper motor may also be configured to control the motor of the mechanism for controlling the storage container gripper. A configuration where the same motor ensures operation of both the delivery container gripper and the storage container gripper may also be envisaged.

In yet another advantageous example of the invention, the delivery container gripper comprises a plurality of claws for gripping coupling structure(s) along the opening frame/rim of the delivery container. The plurality of claws of the delivery container gripper may operate in a similar way as the plurality of claws of the storage container gripper described above.

In yet another advantageous example of the invention, at least a part of the storage container gripper protrudes from locations at or near a periphery of the coupler frame's lower face and at least a part of the delivery container gripper protrudes from the coupler frame's lower face at locations at least a distance $D_{DG}$ from said periphery. The distance $D_{DG}$, corresponds to the minimum distance between said periphery and the opening into the delivery container when the coupler has been correctly positioned for coupling.

In yet another advantageous example of the invention, the delivery container gripper and the storage container gripper are configured to be independently operated. For example, the coupler may comprise a first control system for controlling the gripper motor operationally coupled to the delivery container gripper and a second control system for controlling the motor operationally coupled to the storage container gripper.

However, even if the two types of container grippers may be operated independently, it may be considered advantageous to also grip the delivery container using the delivery container gripper when the coupler frame is being used to pick up the storage container using the storage container gripper. For example, the use of both container grippers may result in more stable lifting/lowering operations, in particular in cases where the outer cross-sectional area of the delivery container is significantly smaller than the cross sectional area of the opening into the storage container. A simultaneous grip of the storage and delivery containers may also provide a greater area of load transfer.

In yet another advantageous example of the invention, the coupler is configured to extend no further in the horizontal direction (i.e. along the upper or lower face of the coupler frame) than an outer perimeter of the storage container it is intended to be coupled with.

In yet another advantageous example of the invention, the coupler includes delivery container guiding plates protruding from the lower face to ensure correct alignment with the opening frame/rim of the delivery container. The lower ends of the guiding plates should hence be arranged such as they correspond to the size of the opening frame if the delivery container. The guiding plates may be resiliently connected to the coupler frame.

In yet another advantageous example of the invention, the coupler includes storage container guiding rods protruding from the lower face to ensure correct alignment with the opening frame/rim of the storage container. The guiding rods should hence be arranged such as they correspond to the size of the opening frame of the storage container. The guiding rods may be fixed at each corners of the coupler frame.

In accordance with a second aspect, the invention concerns a coupler for coupling, preferably selective, to a storage container and/or a delivery container arrangeable within an inner volume of the storage container.

The coupler comprises a coupler frame for attachment to a container handling vehicle in accordance with any of the features described above and preferably also mounts arranged at an upper face of the coupler frame for attachment of lifting bands.

The coupler further comprises a delivery container gripper provided on the coupler frame and protruding from a lower face of the coupler frame, wherein the delivery container gripper is configured to enable releasable coupling to corresponding coupling structure(s) of the delivery container, and a storage container gripper provided on the coupler frame and protruding from the lower face of the coupler frame, wherein the storage container gripper is configured to enable releasable coupling to corresponding coupling structure(s) of the storage container.

Hence, due to the presence of both the delivery container gripper and the storage container gripper on the coupler frame, the coupler allows, in one single lifting operation, coupling to the delivery container or to the storage container or coupling to both. When attached to the vehicle, at least one of the delivery container and the storage container may be lifted into any storage container space of the vehicle.

Furthermore, the coupler may have any of the configuration mentioned above in connection with the description of the first aspect.

In accordance with a third aspect, the invention concerns a storage and retrieval system comprising a framework and a container handling vehicle according to any features described above in connection with the first aspect.

In an advantageous example of the third aspect of the invention, the framework comprises a plurality of vertical upright members defining a plurality of storage columns for storing stacks of storage containers and a rail system constituting an uppermost part the framework. The rail system comprises perpendicular rails intersecting to form a grid of grid cells defining grid openings into the plurality of storage columns. The container handling vehicle(s) is/are configured to operate on the rail system.

In another advantageous example of the third aspect of the invention, the storage and retrieval system further comprises a port column and an access and distribution station arranged at a lower end of the port column for further handling of containers.

To enable successful retrieval/storage of containers from/to the storage columns, the coupler frame should have a cross sectional area that is smaller than the cross sectional area of the grid openings, but larger than the cross sectional area of the opening into the storage containers.

Typically, the cross-sectional area of the storage containers is similar to the cross sectional area of the grid opening. In this particular case, the cross-sectional area of the coupler frame should correspond to the cross-sectional area of the storage container's opening frame/rim.

In yet another advantageous example of the third aspect of the invention, the storage and retrieval system further comprises a main control system and a robotic picking device in signal communication with the main control system.

The robotic picking device may comprise a robotic base, a first robotic segment rotatably connected to the robotic base and an operative end configured to allow releasable connection at least to the delivery container. The operative end may be designed with a coupler having a delivery container gripper as described for the first or second aspect. Such coupler may also be equipped with a storage container gripper as described above, thereby allowing handling of both storage containers and delivery containers. An operative end having a coupler with a storage container gripper only may also be envisaged.

Furthermore, the robotic picking device may be configured such that the operative end is movable to a position which is at least within reach of the storage container or the delivery container to be delivered or removed from the framework of that storage and retrieval system.

The robotic base may in one embodiment be arranged on the floor of the framework. Alternatively, or in addition, the robotic base may be arranged directly or indirectly on the rail system.

In accordance with a fourth aspect, the invention concerns a method for lifting a delivery container arranged within a storage container using a container handling vehicle as described in accordance with the first aspect of the invention.

The method comprises the steps of

- moving the container handling vehicle along a horizontal plane, for example a rail system as described for the third aspect of the invention, to a position in which the coupler is above a storage container containing a delivery container,
- lowering the coupler to a position in which the coupler may connect with the storage container by operating the storage container gripper or to a position in which the coupler may connect with the delivery container by operating the delivery container gripper,
- connecting the coupler to the storage container or to the delivery container by operating the storage container gripper or the delivery container coupling gripper, respectively or connecting the coupler to both the storage container and the delivery container and
- raising the storage container with the delivery container, or raising the delivery container only from within the storage container, by operating the lifting mechanism until the respective containers is/are above the horizontal plane.

Typically, the arrangement of the storage container gripper and the delivery container gripper is such that a position for gripping a storage container is identical to the position of gripping the delivery container. This is feasible with a cuboid coupler frame when the height of the storage container is equal or larger than the height of the delivery container.

In an advantageous example of the fourth aspect of the invention, the storage container is stored within a storage and retrieval system according to the third aspect of the invention, wherein the container handling vehicle further comprises a first set of wheels for moving the container handling vehicle in a first direction X along the rail system and a second set of wheels for moving the container handling vehicle in a second direction Y along the rail system, the second direction Y being perpendicular to the first direction Y.

In another advantageous example of the fourth aspect of the invention, the method further comprises the steps of

- moving the container handling vehicle to a position where the storage container containing the delivery container, or the delivery container having been lifted out of the storage container, is positioned above a port column and
- transporting the storage and delivery containers, or only the delivery container, through the first port column to an access and distribution station located at a lower end of the port column.

In yet another advantageous example of the fourth aspect of the invention, the method further comprises the steps of

- moving the container handling vehicle to a position such that the coupler is above the port column, wherein the lower end of the port column is above or adjacent to the access and distribution station,
- lowering the coupler into the port column until the coupler is in a gripping position with a storage container or a delivery container arranged at a lower end of the port column,
- connecting the storage container or the delivery container to the coupler by operating the storage container gripper or the delivery container gripper (3), respectively, or a combination thereof, and
- raising the storage container, possibly containing a delivery container, or the delivery container, above the rail system.

In accordance with a fifth aspect, the invention concerns a computer-readable medium having stored thereon a computer program for controlling a container handling vehicle according to the first aspect of the invention, wherein the computer program comprises instructions to execute the method steps according to the fourth aspect of the invention.

BRIEF DESCRIPTION OF THE DRAWINGS

The following drawings depict alternatives of the present invention and are appended to facilitate the understanding of the invention. However, the features disclosed in the drawings are for illustrative purposes only and shall not be interpreted in a limiting sense.

FIGS. 8A-8B shows cross sectional side views of a coupler in accordance with an embodiment of the invention, arranged in a gripping position on top of a storage container containing a delivery container, wherein FIG. 8A and FIG. 8B show delivery container grippers in a gripping position and in a released position, respectively.

FIGS. 9A-9B are cross sectional views of the coupler shown in FIG. 8, wherein FIG. 9A shows a cross sectional side view of the coupler on top of a storage container containing a delivery container, wherein the coupler grips both the storage container and the delivery container, and FIG. 9B shows a cross sectional top view of the coupler.

DETAILED DESCRIPTION OF THE INVENTION

Figure 1:
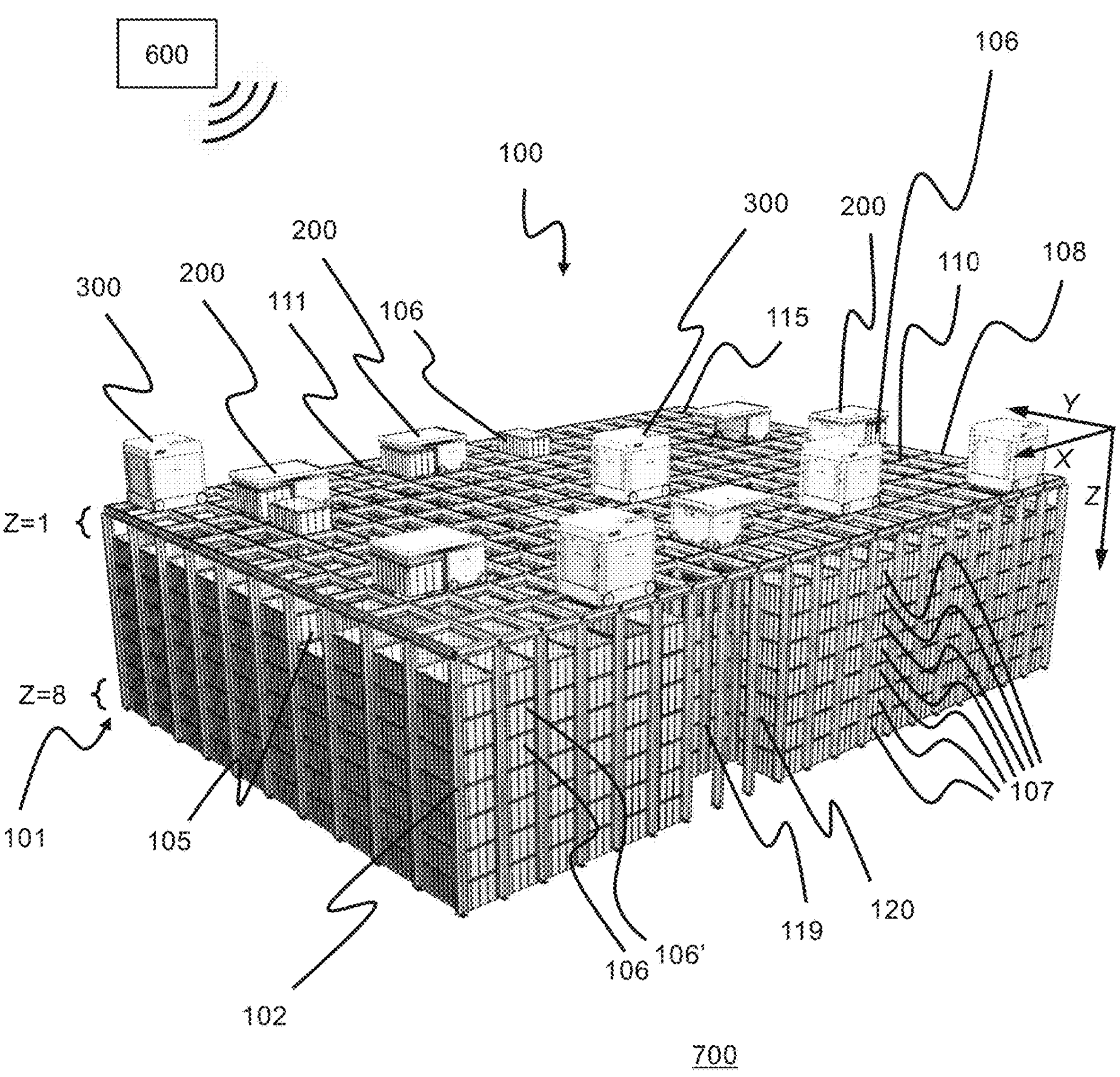
FIG. 1 is a perspective view of a prior art automated storage and retrieval system.

In the following, different embodiments will be discussed in more detail with reference to the appended drawings. It should be understood, however, that the drawings are not intended to limit the scope of the invention to the subject-matter depicted in the drawings. Furthermore, even if some of the features are described in relation to the system only, it is apparent that they are valid for the methods as well, and vice versa.

Figure 2:
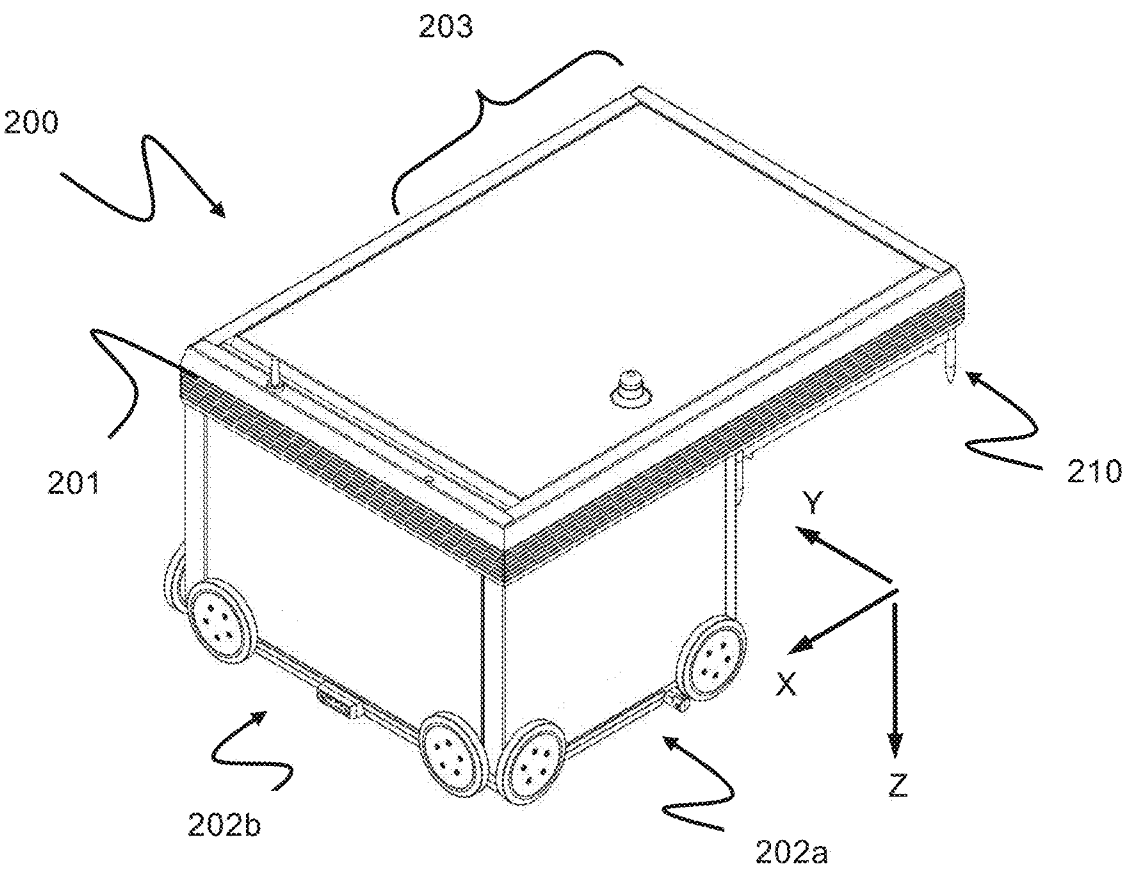
FIG. 2 is a perspective view of a prior art container handling vehicle having a cantilever for carrying storage containers underneath.
Figure 3:
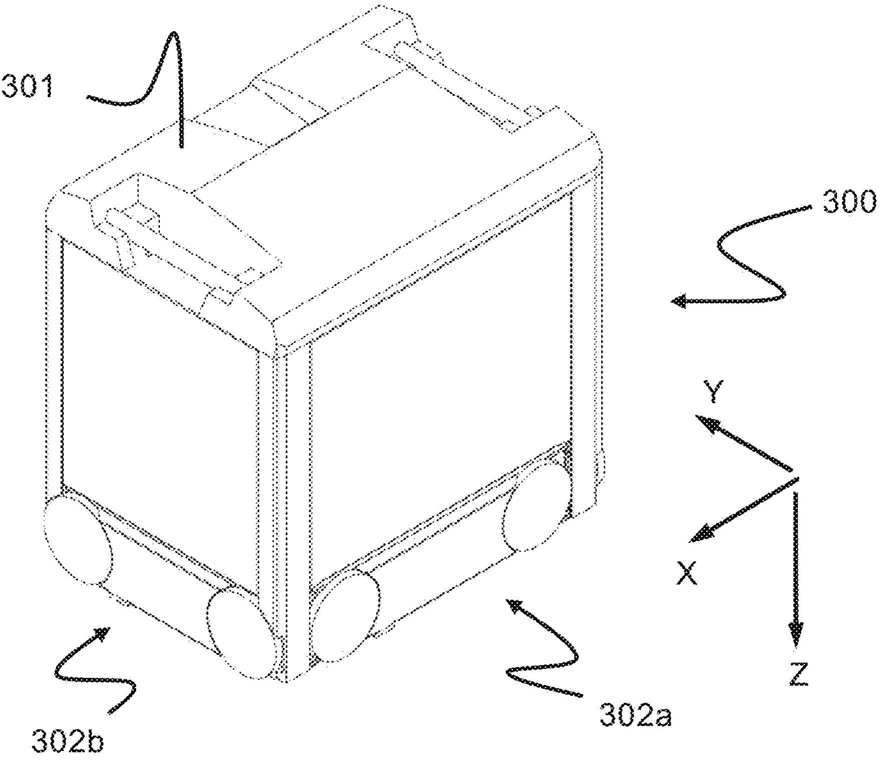
FIG. 3 is a perspective view of a prior art container handling vehicle having a centrally arranged cavity for carrying storage containers therein.
Figure 4:
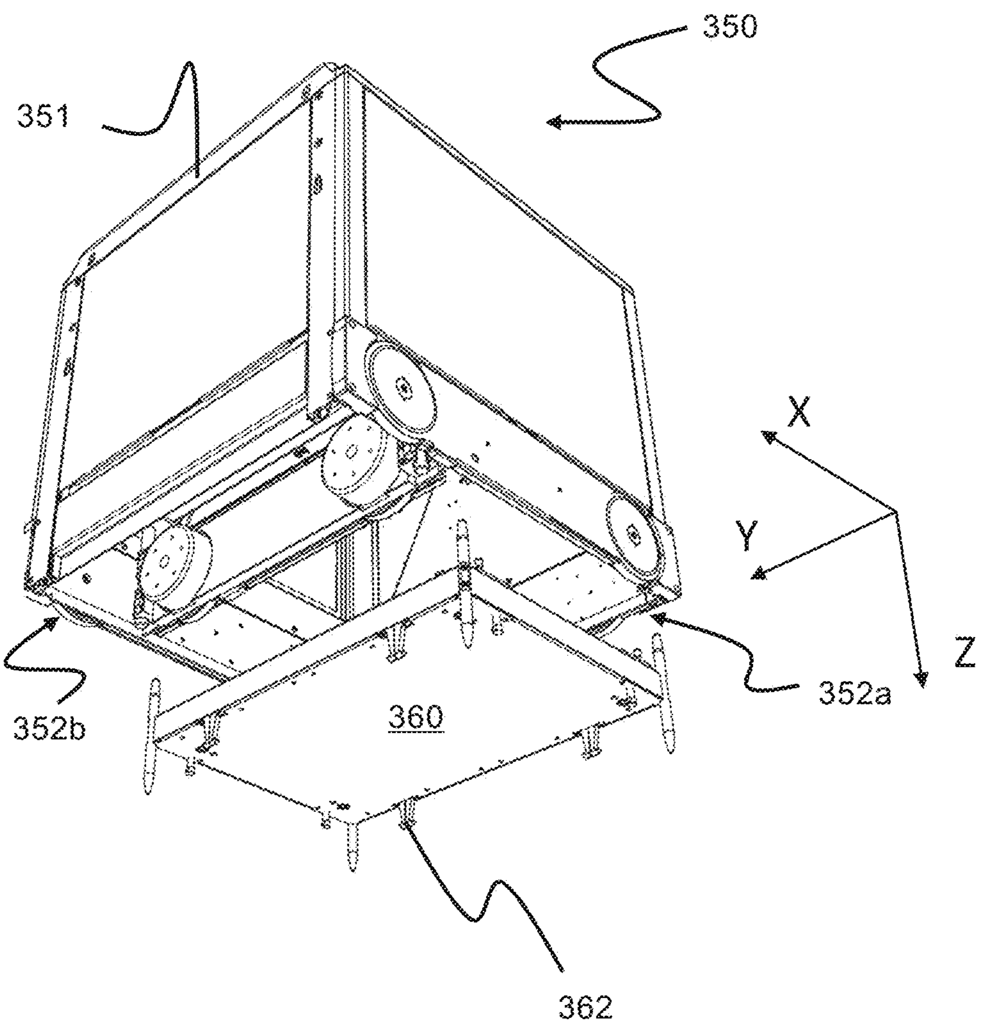
FIG. 4 is a perspective view of a prior art container handling vehicle having an internally arranged cavity for carrying storage containers therein, wherein the cavity is offset from center relative to the X-direction.
Figure 5:
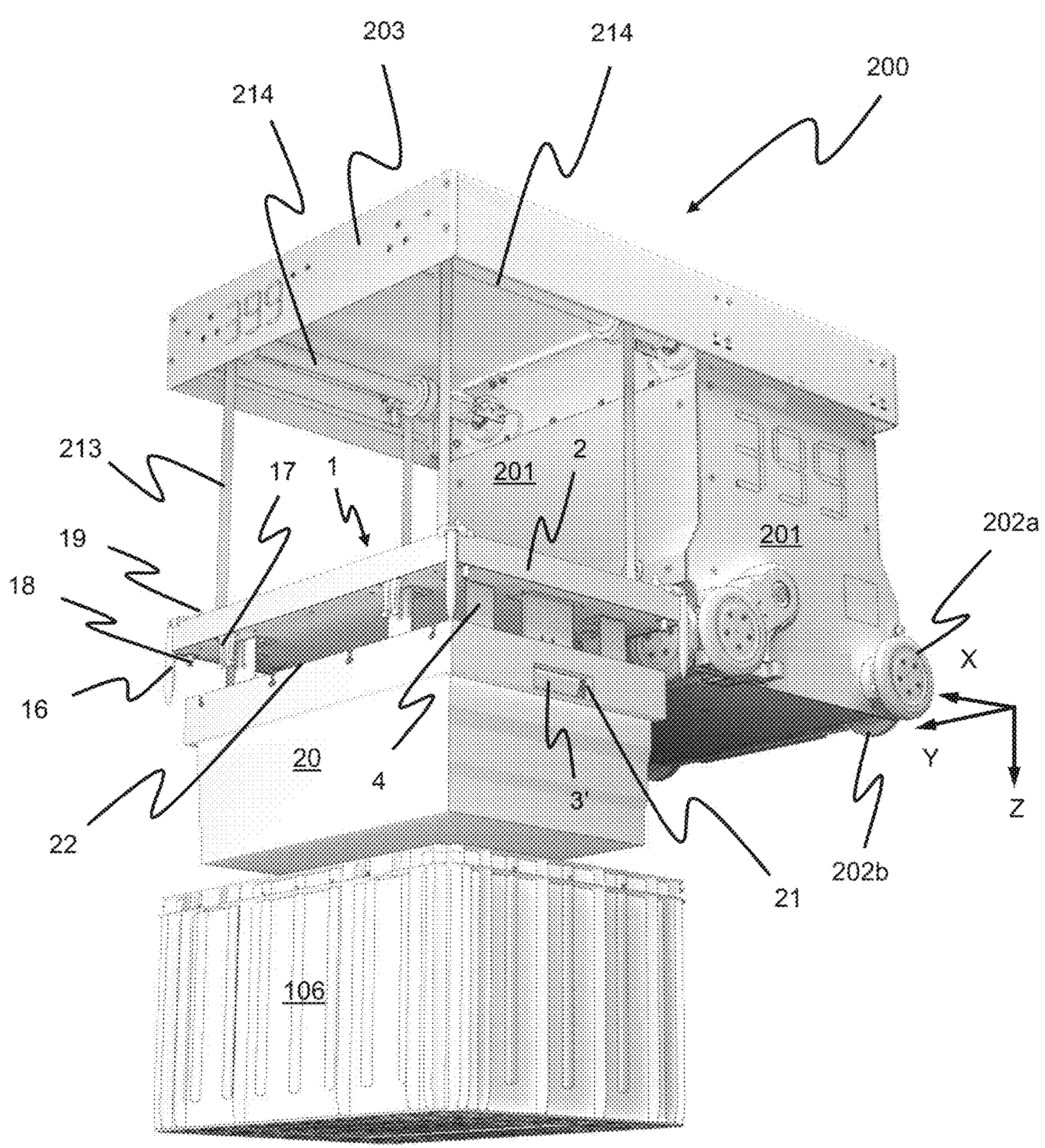
FIG. 5 is a perspective side view of a container handling vehicle in accordance with an embodiment of the invention, wherein a coupler has gripped a delivery container and, by use of a lifting mechanism, has lifted the delivery container out from a storage container.

FIG. 5 shows in perspective an inventive cantilever type container handling vehicle 200 comprising a vehicle body 201, a first set of wheels 202*a* for movements in X direction, a second set of wheels 202*b* for movements in Y direction, a cantilever part 203 extending in X direction from the upper part of the vehicle body 201, rotatable axles 214 arranged in X direction below the cantilever 203, a coupler 1 configured to releasably grab and lift both a storage container 106 (hereinafter called a bin) and a delivery container 30 (hereinafter called a tote), bands 213 having one end spooled onto the rotatable axles 214 and the other end attached to the coupler 1. The rotatable axles 214 and the bands 213 allow controlled lifting and lowering of the coupler 1, respectively, into and out of a container receiving space set by the volume between the horizontal extent of the cantilever part 203 and the height between an underside of the cantilever part 203 and the lowermost parts of the wheels 202*a,b*. The coupler 1 may be considered as a modification of the prior art lifting device 210,360 that was previously only capable of gripping one type of containers 106 (FIGS. 2 and 4).

Figure 6:
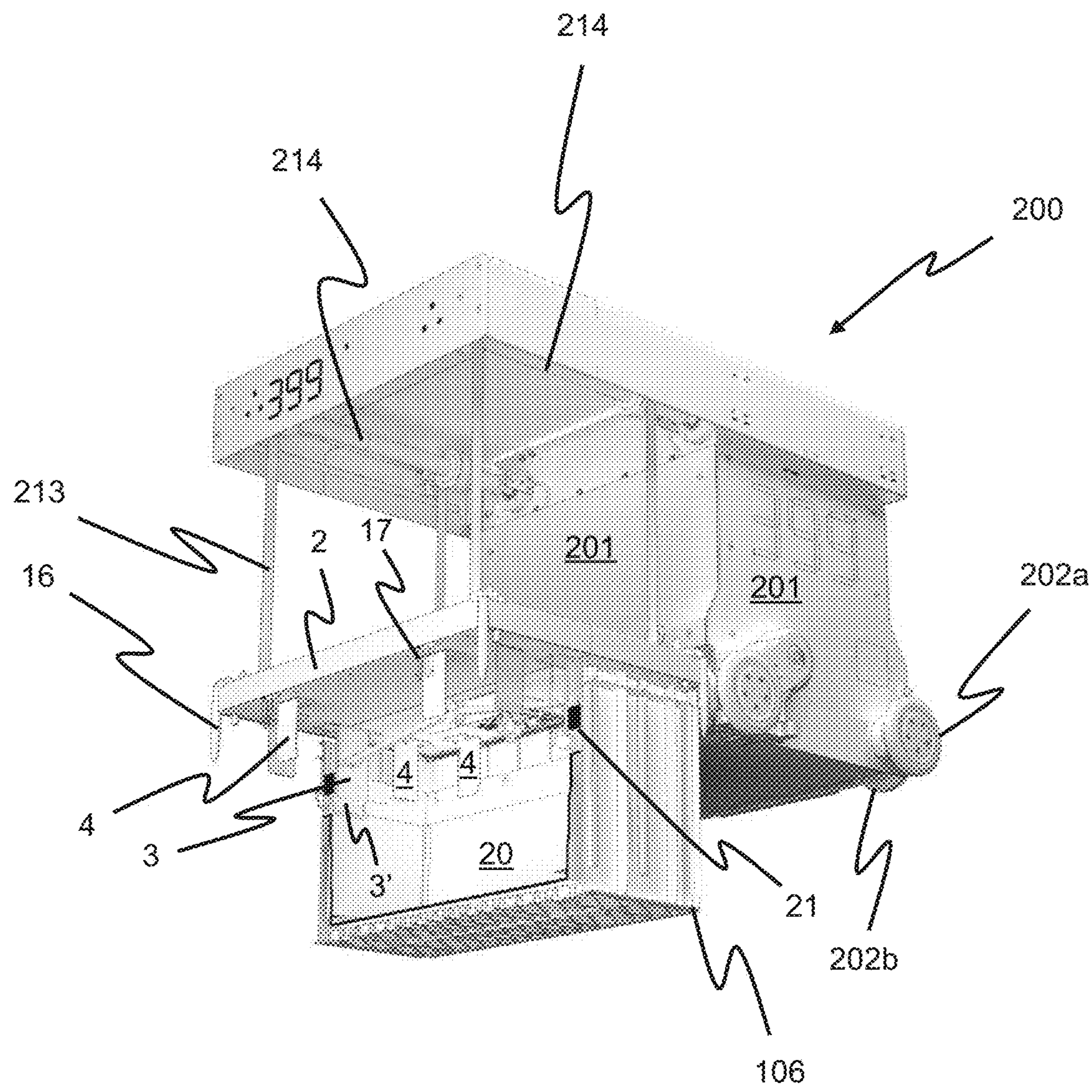
FIG. 6 is a perspective side view of the container handling vehicle shown in FIG. 5, wherein container grippers constituting parts of the coupler have gripped the delivery container and the storage container.
Figure 7:
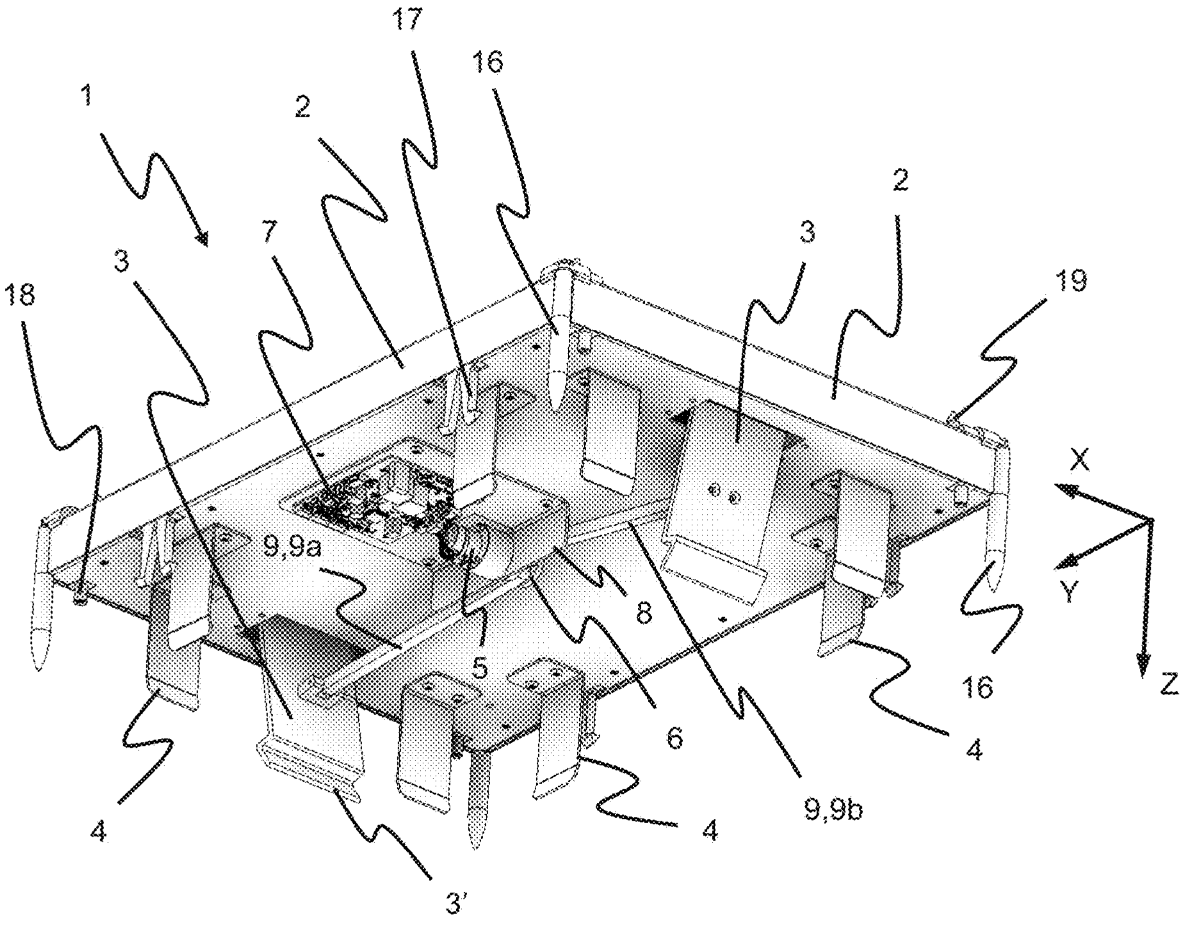
FIG. 7 is a perspective side view of a coupler in accordance with an embodiment of the invention.

With particular reference to FIGS. 6 and 7, the coupler 1 includes a coupler frame 2 having a lower face and an upper face oriented in an X,Y-plane and storage container grippers/bin grippers 17 such as claws or hooks protruding in the Z-direction from the lower face. The bands 213 are attached at their lower ends to mounts/points 213' (see FIG. 9B) provided at the upper face of the coupler frame 2. The mounts 213' may be simple fixation points or they may be devices allowing adjustments of the vertical length between the rotatable axle 214 and the coupler 1. An example of the latter may be a drum that may be remotely controlled or capable of performing said vertical adjustment autonomously.

Figures 8A, 8B:
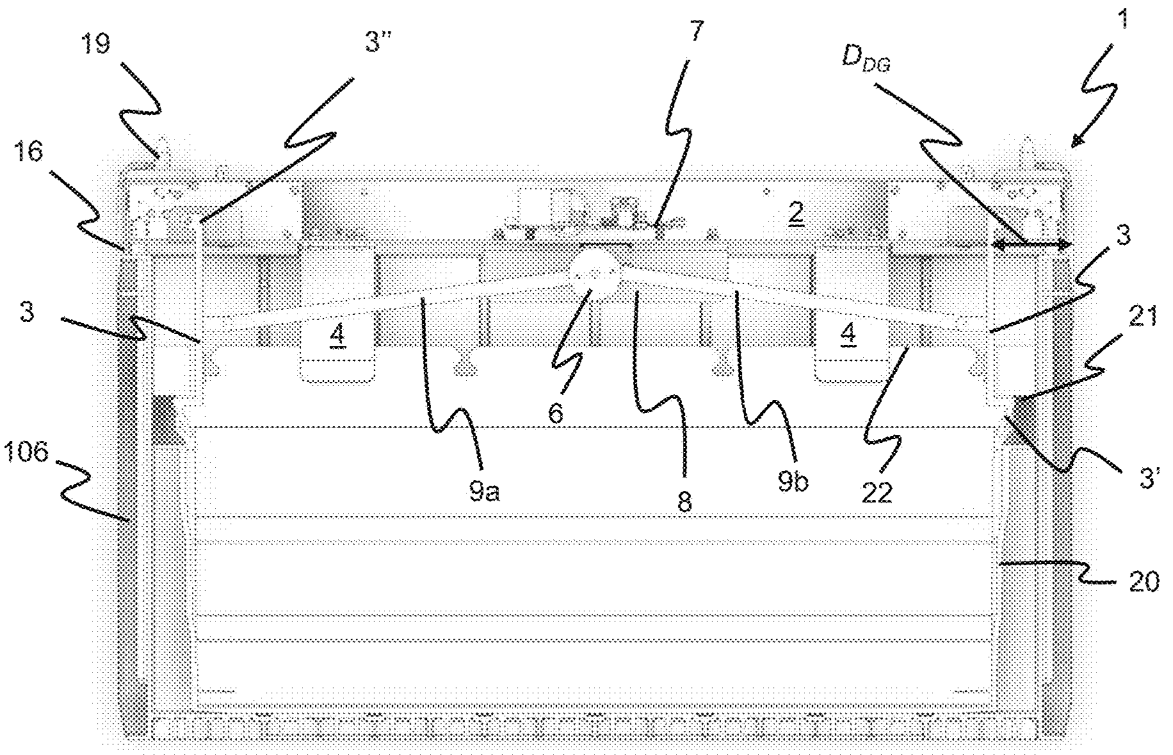

The coupler 1 further includes delivery container grippers/tote grippers 3 configured to enable releasable coupling to corresponding coupling structure(s) 21 of a tote 20, wherein the size of the tote 20 is such that it may fit into the bin 106. The maximum outer cross-sectional area of the tote 20 should be smaller than the minimum cross-sectional area of the opening into the bin 106 (the tote 20 may also include a lip which rests on a rim of the bin 106 in some arrangements (not shown)). As seen in FIGS. 6, 8 and 9, the height of the tote 20 is typically lower than the height of the bin 106.

With further reference to FIGS. 6, 8 and 9, the tote grippers 3 allows coupling to gripping structures/formations 21 located on the inner walls of the tote 20.

Figures 9A, 9B:
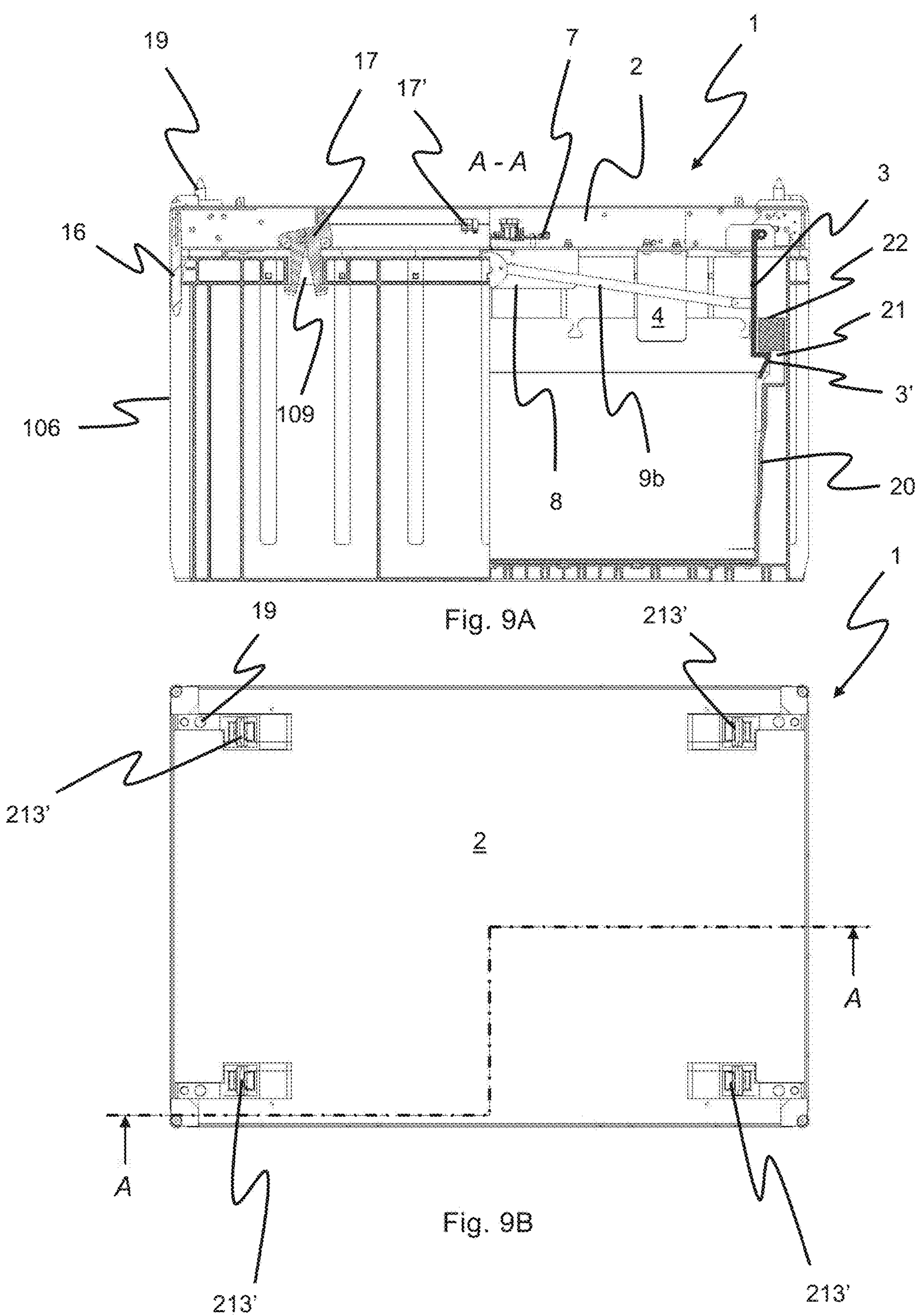

The gripping structures 21 are in the figures illustrated as indents/recesses/apertures located into the tote's inner walls, below the tote's rim 22. However, other designs may be envisaged, such as gripping structures 21 situated on or at the rim of the tote 20. As an example of the latter, the gripper structures 21 may be in form of recesses on the tote's rim 22 similar or identical to bin gripping recesses 109 into which bin grippers/claws 17 may be inserted (FIG. 9A).

The tote grippers 3 are in the figures illustrated as two container gripper paddles 3 (a first paddle 3*a* and a second paddle 3*b*), hereinafter called gripper paddles, where each gripper paddle 3*a*,3*b* has a protrusion 3' such as a ledge, rib or fold at the lower end. The upper end 3" of the gripper paddles 3 is attached pivotally and/or resiliently to the coupler frame 2 and the length and design of each gripper paddle 3 is such that the protrusions 3' are vertically aligned (same height) with the indents/recesses/apertures 21 within inner walls of the tote 20 when the coupler frame 2 is abutting, or near abutting, the opening frame/upper rim of the bin 106.

An actuator system 5-9, which also forms part of the coupler 1, is arranged with the coupler frame 2 and/or below the frame's lower face and configured such that it may displace the first and second gripper paddles 3*a*,3*b* in opposite directions, the movement being controlled remotely.

In the particular embodiment shown in FIGS. 6-9, the actuator system 5-9 includes a motor 5, a coupler control system 7 allowing control of the operation of the motor 5 and signal communication with a main control system 600, a rotary disc 6 connected to the motor 5 and two links/displacement arms 9*a*,9*b* connecting the rotary disc 6 to each of the gripper paddles 3*a*,3*b*.

The motor 5, the rotary disc 6 and the coupler control system 7 are fixed directly to the coupler frame 2*a*, or via a motor support 8, shown in the form of an angle bracket. The motor 5 may for example be a DC motor.

The two links 9*a*,9*b* are in FIGS. 6-9 configured and sized in the following way:

A first end of the first link 9*a* and a first end of the second link 9*b* are pivotably connected to the rotary disc 6 at opposite sides of the disc's 6 rotational axis, while a second end of the first link 9*a* and a second end of the second link 9*b* are pivotably connected to the first gripper paddle 3*a* and the second gripper paddle 3*b*.

The particular configuration with opposite positioned first ends of the links 9*a,b* on the rotary disc 6 result in an equal length and opposite directed displacement of the links 9*a*,9*b*, and hence an equal pivoting of the gripper paddles 3*a*,3*b*.

By adjusting the position, angle and length of the gripper paddles 3 such that the protrusions 3' are aligned at the same vertical level as the indents/recesses/apertures 21 of the tote 20, and allowing rotation of the rotary disc 6 by use of the motor 5 to cause horizontal deflections of the griper paddles 3, the actuator system 5-9 allows switching between a locked position where the protrusions 3' are inserted inside the respective indents/recesses/apertures 21 and a released position where the protrusions 3' are removed from the respective indents/recesses/apertures 21.

The degree of rotation of the rotary disc 6 by the motor 5 should be sufficient to secure insertion of the protrusions 3' into the indents/recesses/apertures 12. The rotation is preferably within a range of 70-100°, for example 90°.

The motor 5 may be operated remotely via a coupler control system 7 arranged on or within the coupler frame 2. The coupler control system 7 may receive control signals remotely via a receiver and/or via signal communication wires from electronics within the vehicle body 201. The signal communication from the coupler control system 7 thus allows control of the motor 5, which operates (via the rotary disc 6 and links 9) the gripper paddles 3 in order to connect to the gripping structures 21 of the tote 20. The coupler control system 7 may also regulate and guide power received from the vehicle body 201 to drive the motor 5.

FIGS. 7-9 show vertical guiding pins 16 which help the coupler 1 to align with the bin 106. During operation, the guiding pins 16 are lowered into and guided by corresponding guiding pin recesses, thereby ensuring correct horizontal alignment of the coupler frame 2.

Still with reference to FIGS. 7-9, the coupler 1 may also comprise tote guiding plates 4 to further aid correct horizontal alignment of the coupler 1. The lower ends of the tote guiding plates 4 should hence be arranged such that they correspond to the size of the opening of tote 20. The guiding plates 4 may be resiliently connected to the coupler frame 2.

FIGS. 8-9 illustrate the situation where the tote 20 has been arranged within the bin 106, and the coupler 1 has been placed correctly on top of an opening frame of the bin 106. FIG. 8 shows the coupler 1 and containers 20,106, the assembly being shown sectioned through the pair of gripper paddles 3, and FIG. 9 shows the same arrangement where the left half is sectioned through the bin grippers 17 and the right half is sectioned through the gripper paddles 3.

The coupler 1 may also include one or more vehicle sensors 19 and one or more bin sensors 18 protruding from the corners of the upper face and the lower face of the coupler frame 2, respectively. The vehicle sensors 19 may register proximity and/or contact with a part of the container handling vehicle 200,300,350, setting an upper vertical boundary of the storage container space. Likewise, the bin sensors 18 may register proximity and/or contact with the rim of the bin 106.

Both types of sensors 18,19 may include a transmitter allowing transmittal of sensed signals to a remote main control system 600. Furthermore, the bin sensor(s) 18/vehicle sensor(s) 19 may be in form of a capacitive sensor (mutual capacitance and/or self-capacitance) for registering direct contact or proximity with the coupler frame 2 or vehicle/crane 200,300,350. The sensor(s) 18,19 may also be in the form of spacers abutting the bin 106 and the vehicle part, respectively.

Other sensor configurations may be envisaged, for example, that the bin sensors 18 also, or alternatively, sense the proximity/contact with the rim 22 of the tote 20.

Tote sensors having similar or equal configurations as the bin sensors 18 may also, or in addition, by arranged on the lower face of the coupler frame 2 to detect proximity/contact with the tote's rim 22.

In case of autonomously operating drums being used as mounts 213' as described above, the vehicle sensors 19 may be used to measure the vertical distance up to the relevant parts of the vehicle 200,300,350 (such as beneath the cantilever part, see FIG. 5) and the measurements feed to the drums to even up the lengths of the bands 213.

When the inner volume of the bin 106 is taller and slightly wider than the tote 20, a periphery or edge surface of the coupler frame 2 may advantageously be slanted inwards in a direction from the upper face to the lower face, thereby further facilitating the horizontal alignment of the coupler 1 relative the containers 20,106.

One particular example of operation using a coupler 1 in a storage and retrieval system 100 as described above and shown in FIGS. 1-9 is a consolidation method for a consolidating tote 20 in a bin 106, where the tote 20 contains one or more items/products to be delivered to customers.

Such an operation may contain the following steps:

1. A vehicle 200,300,350 having a coupler 1 as described above is instructed to move to a position on a rail system 108 where the coupler 1 is aligned directly above a storage column 105 in which a bin 106 containing a target tote 20 is arranged on top of a stack 107. The rail system 108, the storage columns 105 and the stacks 107 may be as depicted in FIG. 1.

2. The vehicle 200,300,350 lowers the coupler 1 to the tote-in-bin arrangement 20,106 until the protrusions 3' of the gripper paddles 3 are in horizontal alignment with the respective gripping structure(s) 21 of the tote 20. The coupler 1 is preferably designed such that this alignment is achieved when the lower face of the coupler frame 2 is abutting a perimeter/opening frame of the bin 106.

3. The coupler control system 7 instructs the motor 5 to rotate the rotary element 6, and thereby to push ends of the links 9*a*,9*b* outwards in opposite directions such that the protrusions 3' couple with the gripping structure 21 (see FIG. 8). The commands may be sent from transmitters within the vehicle body 201 remotely or via communication wires, or remotely from a main control system 600, to a receiver in the coupler control system 7. Such a receiver may also form an integral part of the motor 5.

4. The vehicle 200,300,350 lifts the coupler 1 with the tote 20 using winch shafts 214 and bands 213 such that the bottom of the tote 20 is positioned a distance above the rail system 108.

5. The vehicle 200,300,350 moves to a position in which the coupler 1 with the target tote 20 is directly above a storage column 105 within a consolidation area of the rail system 108, where a bin available from the rail system 108 (typically at the top of the stack 107) is empty.

6. The vehicle 200,300,350 places the target tote 20 within the empty bin 106 by lowering the coupler 1 such that the target tote 20 is at least partly, preferably fully, within the bin 106 and disconnecting the protrusions 3' from the gripping structure(s) 21 by rotating the rotary element 6 in opposite direction as in point 3.

7. When one or more of the products stored within the target tote 20 is to be retrieved from the storage and retrieval system 100, a vehicle 200,300,350 is moved to the storage column 105 in point 6 and the target tote 20 is picked up from the bin 106 using the same procedure as in points 1-4.

8. The vehicle 200,300,350 is moved to a position in which the coupler 1 with the target tote 20 is positioned directly above a drop-off port column 119 (see FIG. 1) and the target tote 20 is lowered through the port column 119 to an access and distribution station 500 arranged at the port column's 119 lower end.

Figure 10:
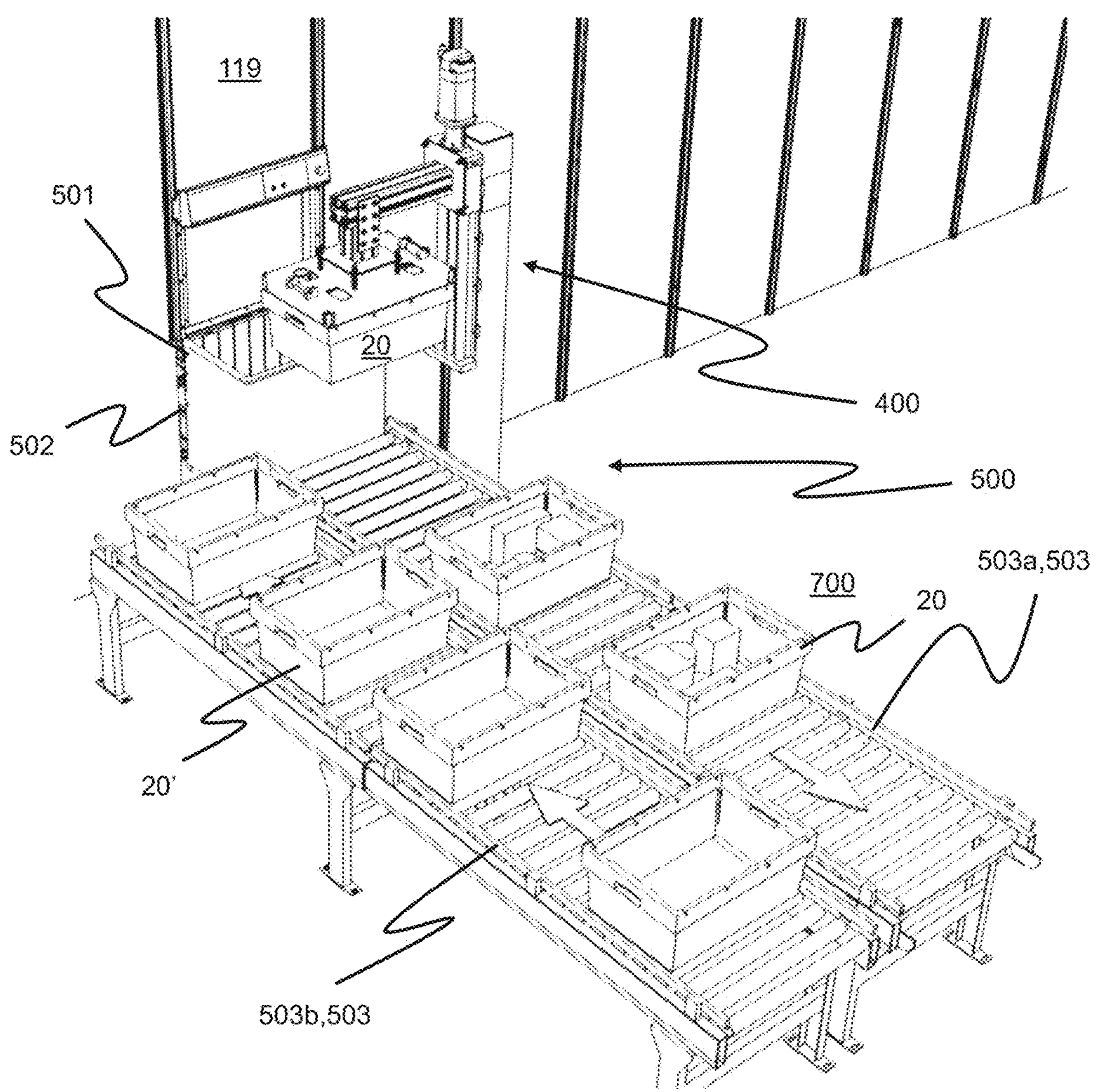
FIG. 10 is a perspective view of part of a storage and retrieval system in accordance with an embodiment of the invention including a first type of robotic picking device for picking delivery containers within storage containers.
Figure 11:
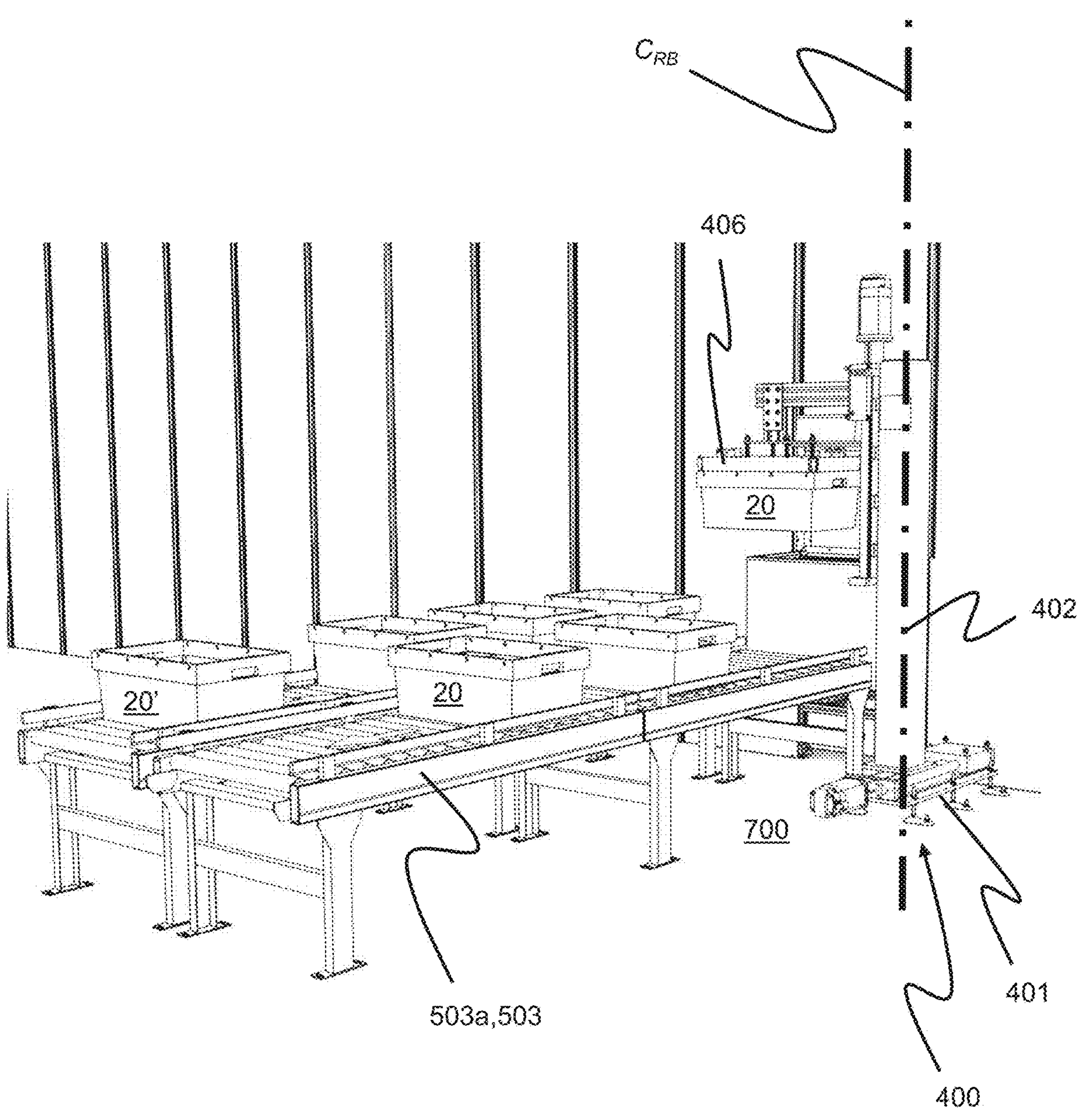
FIG. 11 is another perspective view of the part of the storage and retrieval system shown in FIG. 10.
Figures 12A, 12B:
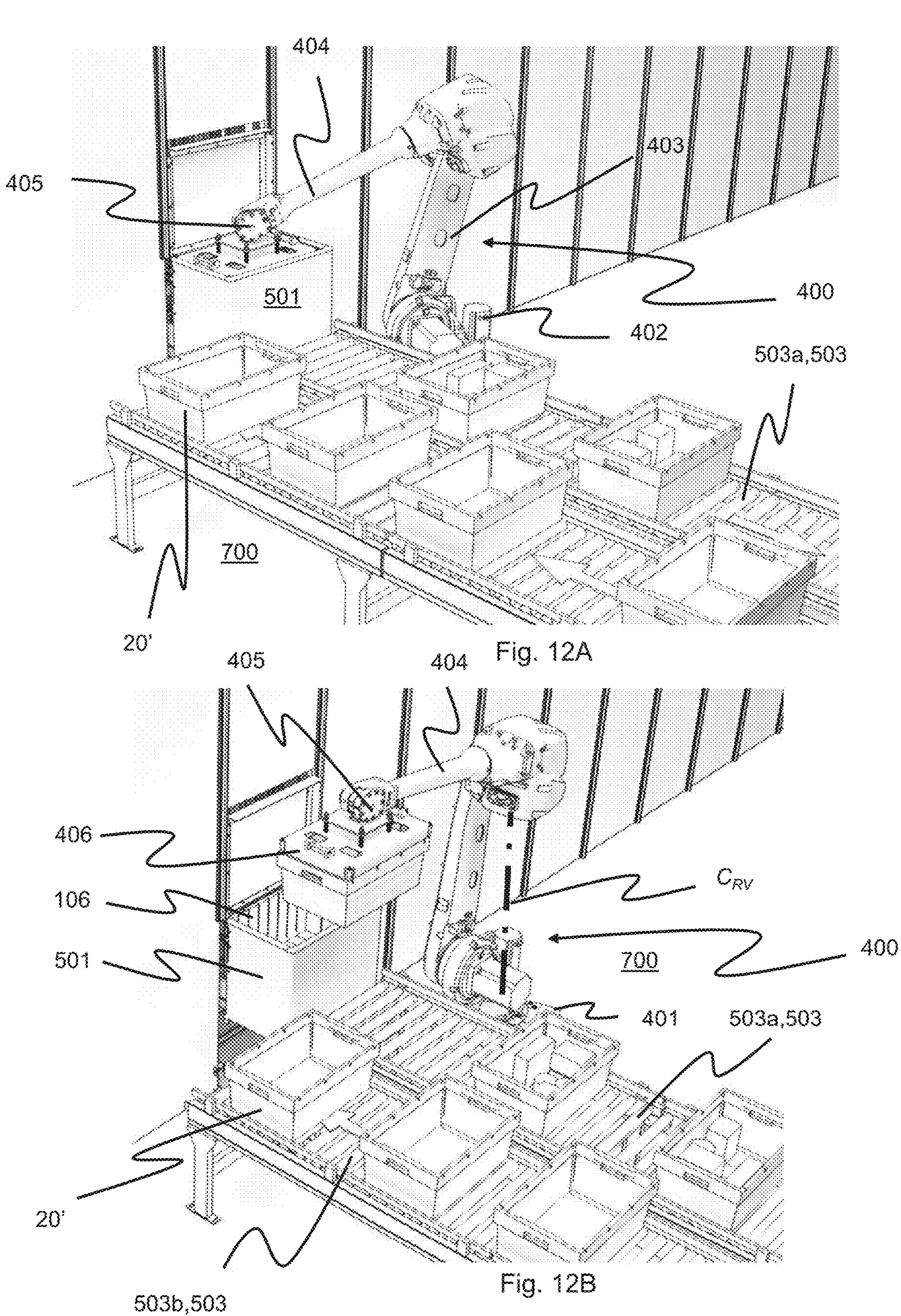
FIGS. 12A-12B are perspective views of part of a storage and retrieval system in accordance with a further embodiment of the invention including a second type of robotic picking device for picking delivery containers within storage containers.

9. The target tote 20 is picked up by a human operator and/or a robotic picking device 400 and placed on a suitable transport mechanism such as a conveyor system 503 for further transport to end customers (FIGS. 10-12).

10. An empty tote 20 is transported by the transport mechanism of point 9 to a position within reach of the human operator and/or the robotic picking device 400.

11. Via a pick-up port column 120, the empty tote 20 is raised to a position a distance above the rail system 108 by use of a vehicle 200,300,350 and placed in a storage column 105 by performing any of steps 1-8 in opposite directions.

The target tote 20 may also be transported directly from the storage column 105 in point 1 to the drop-off port column 119 (hence omitting steps 5-7).

Further, only one port column 119 or 120 may be used throughout the performance of steps 1-11.

Other mechanisms to transport the target totes 20 from the vehicle 200,300,350 to the access and distribution station 500 may be envisaged, for example, including separate bin transport devices such as vertical bin lifts and/or slanted conveyor belts.

FIGS. 10-12 show two different examples of a product handling system 400,500 arranged adjacent a drop-off port column 119 of an automated storage and retrieval system 100. The product handling system 400,500 in this arrangement includes a robotic picking device 400 and an access and distribution station 500.

The robotic picking device 400 of FIGS. 10-12 comprises a robotic base 401, two or more robotic segments 402-404 and an operative end 405 configured to grab and release a tote 20, for example, by use of a second coupler similar or identical to the coupler 1 described above.

In the first examples shown in FIGS. 10 and 11, the access and distribution station 500 includes a container basket 501 configured to temporarily store/hold a bin 106 and a storage system access opening 502 through which the container basket 501 may be guided, for example, by use of a container basket displacement mechanism (not shown). The container basket 501 may also be configured to allow temporarily storing totes 20 only. A configuration where the container basket 501 may either store bins 106 or smaller totes 20 may also be envisaged.

The station 500 of FIGS. 10 and 11 further includes a conveyor system 503 located at least partly outside the framework 101 of the storage and retrieval system 100. The conveyor system 503 may comprise a first conveyor belt **503*a* and a second conveyor belt 503*b* arranged parallel to each other. As illustrated in FIG. 11, by placing an end of each of the conveyor belts 503*a,b* next to the access opening 502, simultaneous transportation of totes 20 to and from the container basket 501 is made possible, thereby increasing the overall efficiency of the product handling system 400, 500**.

With particular reference to FIG. 11, the robotic picking device 400 comprises in this first example

- a robotic base 401 fixed on a platform/floor 700,
- a first robotic segment 402 providing vertical movement relative to the robotic base 401,
- a second robotic segment 403 providing horizontal movement relative to the first robotic segment 402 (the first and second segments allowing controlled vertical and/or horizontal displacement), and
- an operative end 405 connected (at least indirectly) to the second robotic segment 403.

The above mentioned second coupler 406 at the operative end 405 of the robotic picking device 400, includes a handle 15 arranged on top of its coupler frame 2.

The orientations of vertical/horizontal is hereinafter measured relative to the platform/floor 700 of the robotic base 401. Note also that the conveyor system 503 and/or the framework 101 of the storage volume of the storage and retrieval system 100 may be supported on the same platform/floor 700 or alternatively supported on other platforms arranged at different vertical levels.

The controlled horizontal and vertical displacements may be achieved by known displacement devices, such as motorized linear actuators and/or hydraulic cylinders. The connecting end of the second robotic segment 403 may, for example, be guided along vertical rods forming part of the first robotic segment 402.

The robotic picking device 400 is further arranged such that the operative end 405 may be maneuvered to a position centered above the container basket 501.

With the particular setup described above, and with the second coupler 406 connected to the operative end 405 of the robotic picking device 400, any tote 20 stored within respective bin 106, which again may be stored within the container basket 501, may be picked up via operation of the second coupler 406 and at least one of the first and second robotic segments 402,403 when the container basket 501 has been placed in a pick-up position outside the access opening 502.

Note that the bins 106 that are designed to contain the totes 20 may stay within the container basket 501 at any time during the operations.

FIG. 12 shows a second example of a product handling system 400,500 using the above-mentioned second coupler 406. The second example is near identical to the first example in structure and operation except it uses another type of robotic picking device 400, namely a multi-joint type robotic picking device.

The multi-joint robotic picking device 400 comprises a robotic base 401 connected to a fixed platform/floor 700, a first robotic segment 402 rotatably connected to the robotic base 401, preferably with a vertical rotational axis $C_{RB}$ oriented perpendicular to the platform/floor 700, a second robotic segment 403 rotatably connected to the first robotic segment 402, preferably with a horizontal rotational axis oriented parallel to the platform/floor 700, a third robotic segment 404 rotatably connected to the second robotic segment 403, an operative end 405 forming part of, or being rotationally coupled to, the third robotic segment 403 and the second coupler 406 as described above connected, preferably removably, to the operative end 405.

All of the joints, i.e. the rotatable connection points described above, are equipped with remotely and/or autonomously operated rotary mechanisms, thereby allowing the multi-joint robotic picking device 400 to pick up a tote 20 with product items from within a bin 106 arranged inside a container basket 501, or directly from the container basket 501, and place the tote 20 onto the conveyor belt 503*a* transporting the tote 20 away from the framework 101. Likewise, the multi-joint configuration allows the robotic picking device 400 to pick an empty tote 20 from the conveyor belt 503*b* transporting the tote 20 towards the framework 101 and place the empty tote 20 into the bin 106 arranged inside the container basket 501, or directly into the container basket 501.

In an alternative consolidation method in accordance with the invention, a robotic picking device 400 is arranged at or above the level of the rail system 108, thereby allowing the consolidations of totes 20 in bins 106 to be performed at least partly by the robotic picking device 400. Such an alternative configuration may also allow direct transfer of products between totes 20 and/or bins 106.

In the preceding description, various aspects of a container handling vehicle for selective coupling to two types of containers; a coupler constituting part of the vehicle, an automated storage and retrieval system and associated methods, have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

REFERENCE NUMERALS

| | |
|---|---|
| 1 | Coupler |
| 2 | Coupler frame |
| 3 | Delivery container gripper/tote gripper/gripper paddle |
| 3' | Protrusion |
| 3" | Upper end of gripper element 3 |
| 4 | Delivery container guiding plate/Tote guiding plate |
| 5 | Gripper motor (for displacing gripper paddles 3) |
| 6 | Rotary element/disc (rotationally connected to motor 5) |
| 7 | Coupler control system (for gripper motor 5) |
| 8 | Motor support/angle bracket |
| 9 | Gripper displacement means |
| 9a | First link |
| 9b | Second link |
| 15 | Connection device |
| 16 | Guiding pin |
| 17 | Storage container gripper/bin gripper/claw/hook |
| 17' | Mechanism for controlling storage container gripper |
| 18 | Storage container sensor/bin sensor/spacer |
| 19 | Vehicle sensor/spacer |
| 20 | Delivery container/tote |
| 20' | Incoming delivery container/incoming tote |
| 21 | Coupling structure/formation/recess/aperture within delivery container |
| 22 | Opening frame/upper rim |
| 100 | Storage and retrieval system |
| 101 | Framework/storage grid |
| 102 | Upright members of framework |
| 105 | Storage column |
| 106' | Storage container |
| 106 | Particular position of a storage container/target storage container |

-continued

| | |
|---|---|
| 107 | Stack |
| 108 | Rail system |
| 109 | Coupling structure of storage container/bin gripping recess |
| 110 | Parallel rails in first direction (X) |
| 111 | Parallel rail in second direction (Y) |
| 115 | Grid opening |
| 119 | Port column/first port column/drop-off column |
| 120 | Second port column/pick-up column |
| 200 | Container handling vehicle with cantilever |
| 201 | Vehicle body of the vehicle 200 |
| 202a | Drive means/wheel arrangement/first set of wheels, first direction (X) |
| 202b | Drive means/wheel arrangement/second set of wheels, second direction (Y) |
| 203 | Cantilever part |
| 210 | Prior art lifting device |
| 213 | Band |
| 213' | Attachment mount/mount/fixation point |
| 214 | Axle/winch shaft |
| 300 | Container handling vehicle occupying a single cell |
| 301 | Vehicle body of the vehicle 300 |
| 302a | Drive means/wheel arrangement, first set of wheels, first direction (X) |
| 302b | Drive means/wheel arrangement, second set of wheels, second direction (Y) |
| 350 | Container handling vehicle with an internal cavity, occupying more than a single cell |
| 351 | Vehicle body of the vehicle 350 |
| 352a | Drive means/wheel arrangement, first set of wheels, first direction (X) |
| 352b | Drive means/wheel arrangement, second set of wheels, second direction (Y) |
| 360 | Coupler for gripping storage container 106 |
| 400 | Robotic picking device |
| 401 | Robotic base |
| 402 | First robotic segment |
| 403 | Second robotic segment |
| 404 | Third robotic segment |
| 405 | Robotic gripper/operative end |
| 500 | Access and distribution station |
| 501 | Container support/container basket |
| 502 | Storage system access opening |
| 503 | Conveyor system |
| 503a | First conveyor belt |
| 503b | Second conveyor belt |
| 600 | Main control system (for controlling the storage and retrieval system 100) |
| 700 | Floor |
| X | First direction |
| Y | Second direction (perpendicular to X) |
| Z | Third direction (perpendicular to X and Y) |
| $C_{VP}$ | Vertical center plane of coupler frame |
| $D_{DG}$ | Minimum distance from periphery of coupler frame's 2 lower face to tote gripper 3 |
| $C_{RB}$ | Rotational robotic base axis |
| $A_{dc}$ | Maximum horizontal cross-sectional area of delivery container/tote |
| $A_{sco}$ | Minimum horizontal cross-sectional area of an opening of storage container/bin |

The invention claimed is:

1. A container handling vehicle comprising a coupler for releasably coupling to a delivery container or a storage container, wherein the coupler comprises:

a coupler frame, a delivery container gripper provided on the coupler frame and protruding from a lower face of the coupler frame, the delivery container gripper being configured to enable releasable coupling to corresponding coupling structure of a delivery container, and a storage container gripper provided on the coupler frame and protruding from the lower face of the coupler frame, the storage container gripper being configured to enable releasable coupling to corresponding coupling structures of a storage container having a size allowing the delivery container to be held therein, wherein the delivery container gripper comprises:

two gripper paddles for gripping the delivery container, each gripper paddle being pivoted from a pivot axis spaced equally and oppositely from a vertical centre plane oriented perpendicular to the lower face of the coupler frame, wherein each of the gripper paddles comprises a protrusion located below the lower face of the coupler frame for insertion into a corresponding coupling structure of the delivery container.

2. The container handling vehicle according to claim 1, wherein the container handling vehicle further comprises:

a lifting mechanism connected to the coupler frame such that the lower face of the coupler frame is aligned with a horizontal plane along which the container handling vehicle may move, wherein the lifting mechanism and the coupler are configured to allow transport of the storage container and/or the delivery container into and out of a space provided for the storage container being handled by the container handling vehicle.

3. The container handling vehicle according to claim 1, wherein the coupler further comprises:

a storage container sensor configured to sense when the lower face of the coupler frame is in contact with, and/or in proximity to, an upper rim of the storage container.

4. The container handling vehicle according to claim 1, wherein the coupler further comprises:

a vehicle sensor configured to sense when an upper portion of the coupler is in contact with, and/or in proximity to, a part of the container handling vehicle setting an upper vertical boundary of a space provided for the storage container being handled by the container handling vehicle.

5. The container handling vehicle according to claim 1, wherein a mechanism allowing the storage container gripper to releasably grip the storage container is arranged at least partly within the coupler frame.

6. The container handling vehicle according to claim 1 wherein the delivery container gripper further comprises:

a displacement system for pivoting the two gripper paddles in opposite directions from the vertical centre plane until the protrusions have engaged the coupling structure.

7. The container handling vehicle according to claim 6, wherein the displacement system comprises:

a gripper motor, a coupler control system configured to control operation of the gripper motor, a first link connected at one end to the gripper motor and the other end to one of the two gripper paddles, and a second link connected at one end to the gripper motor and the other end to the other of the two gripper paddles, wherein the gripper motor is configured to displace the first and second links in opposite directions away from the vertical centre plane.

8. The container handling vehicle according to claim 7, wherein the displacement system further comprises:

a rotary element connecting the first and second links to a shaft of the gripper motor, wherein the gripper motor, the rotary element and the links are configured such that the opposite directed displacement of the first and second links is achieved by rotating the rotary element clockwise or counter-clockwise between 0 degrees and 180 degrees.

9. A coupler for coupling to a storage container and/or a delivery container arrangeable within an inner volume of the storage container, wherein the coupler comprises:

a coupler frame for attachment to a container handling vehicle in accordance with claim 1, a delivery container gripper provided on the coupler frame and protruding from a lower face of the coupler frame, the delivery container gripper being configured to enable releasable coupling to corresponding coupling structures of the delivery container, wherein the delivery container gripper comprises:

two gripper paddles for gripping the delivery container, each gripper paddle being pivoted from a pivot axis spaced equally and oppositely from a vertical centre plane oriented perpendicular to the lower face of the coupler frame, wherein each of the gripper paddles comprise a protrusion located below the to face of the coupler frame for insertion into a corresponding coupling structure of the delivery container, and a storage container gripper provided on the coupler frame and protruding from the lower face of the coupler frame, the storage container gripper being configured to enable releasable coupling to corresponding coupling structures of the storage container.

10. A storage and retrieval system comprising:

a framework, and a container handling vehicle according to claim 1 wherein the framework comprises a plurality of vertical upright members defining a plurality of storage columns for storing stacks of storage containers and a rail system constituting an uppermost part the framework, the rail system comprising perpendicular rails, the intersections of which rails form a grid of grid cells defining grid openings into the plurality of storage columns, and wherein the container handling vehicle is configured to operate on the rail system.

11. The storage and retrieval system according to claim 10, wherein the storage and retrieval system further comprises:

a port column, and an access and distribution station arranged at a lower end of the port column.

12. The storage and retrieval system in accordance with claim 10, wherein the storage and retrieval system further comprises:

a main control system, and a robotic picking device in signal communication with the main control system, the robotic picking device comprising a robotic base, a first robotic segment rotatably connected to the robotic base and an operative end configured to allow releasable connection to the delivery container, wherein the robotic picking device is configured such that the operative end may be moved to a position at least within reach of the storage container or the delivery container to be delivered to the framework.

13. A method for lifting a delivery container arranged within a storage container using a container handling vehicle fitted with a coupler for coupling to a delivery container and/or to a storage container, the coupler comprising:

coupler frame, a delivery container gripper provided on the coupler frame and protruding, from a lower face of the coupler frame the delivery container gripper being configured to enable releasable coupling to corresponding coupling structure of a delivery container, and a storage container gripper provided on the coupler frame and protruding from the lower face of the coupler frame the storage container gripper being configured to enable releasable coupling to corresponding coupling structures of a storage container having a size allowing the delivery container to be held therein, wherein the delivery container gripper comprises:

two gripper paddles for gripping the delivery container, each gripper paddle being pivoted from a pivot axis spaced equally and oppositely from a vertical centre plane oriented perpendicular to the lower face of the coupler frame, wherein each of the gripper paddles comprises a protrusion located below the lower face of the coupler frame for insertion into a corresponding coupling structure of the delivery container, wherein the method comprises:

moving the container handling vehicle along a horizontal plane to a position in which the coupler is above a storage container containing a delivery, container, lowering the coupler to a position in which the coupler may connect with the storage container by operating the storage container gripper and/or with the delivery container by operating the delivery container gripper, connecting the coupler to the storage container or to the delivery container by operating the storage container gripper or the delivery container coupling gripper, respectively, and raising the storage container with the delivery container, or raising the delivery container only from within the storage container, by operating a lifting mechanism until the respective container(s) is/are above the horizontal plane on which the container handling vehicle is moving.

14. The method in accordance with claim 13, wherein the storage container is stored within a storage and retrieval system comprising:

a framework, and a container handling vehicle fitted with a coupler for coupling to a delivery container and/or to a storage container, the coupler comprising:

a coupler frame, a delivery container gripper provided on the coupler frame and protruding from a lower face of the coupler frame, the delivery container gripper being configured to enable releasable coupling to corresponding coupling structure of a delivery container, and a storage container gripper provided on the coupler frame and protruding from the lower face of the coupler frame, the storage container gripper being configured to enable releasable coupling to corresponding coupling structures of a storage container having a size allowing the delivery container to be held therein, wherein the delivery container gripper comprises:

two gripper paddles for gripping the delivery container, each gripper paddle being pivoted from a pivot axis spaced equally and oppositely from a vertical centre plane oriented perpendicular to the lower face of the coupler frame, wherein each of the gripper paddles comprises a protrusion located below the lower face of the coupler frame for insertion into a corresponding coupling structure of the delivery container, wherein the framework comprises a plurality of vertical upright members defining a plurality of storage columns for storing stacks of storage containers and a rail system constituting an uppermost part the framework, the rail system comprising perpendicular rails, the intersections of which rails form a grid of grid cells defining grid openings into the plurality of storage columns, and wherein the container handling vehicle is configured to operate on the rail system, wherein the container handling vehicle further comprises a first set of wheels for moving the container handling vehicle in a first direction along the rail system and a second set of wheels for moving the container handling vehicle in a second direction along the rail system, the second direction being perpendicular to the first direction, wherein the method further comprises:

moving the container handling vehicle to a position where the storage container containing the delivery container, or the delivery container having been lifted out of the storage container, is above a port column, and transporting the storage container containing the delivery container, or the delivery container, through the port column to an access and distribution station located at a lower end of the port column.

15. The method in accordance with claim 14, wherein the method further comprises:

moving the container handling vehicle to a position such that the coupler is above the port column, wherein the lower ends of the port column is above or adjacent to the access and distribution station, lowering the coupler into the port column until the coupler is in a gripping position with a storage container or a delivery container arranged at a lower end of the port column, connecting the storage container or the delivery container to the coupler by operating the storage container gripper or the delivery container gripper, respectively, and raising the storage container or the delivery container above the rail system.

* * * * *